UNITED STATES PATENT OFFICE.

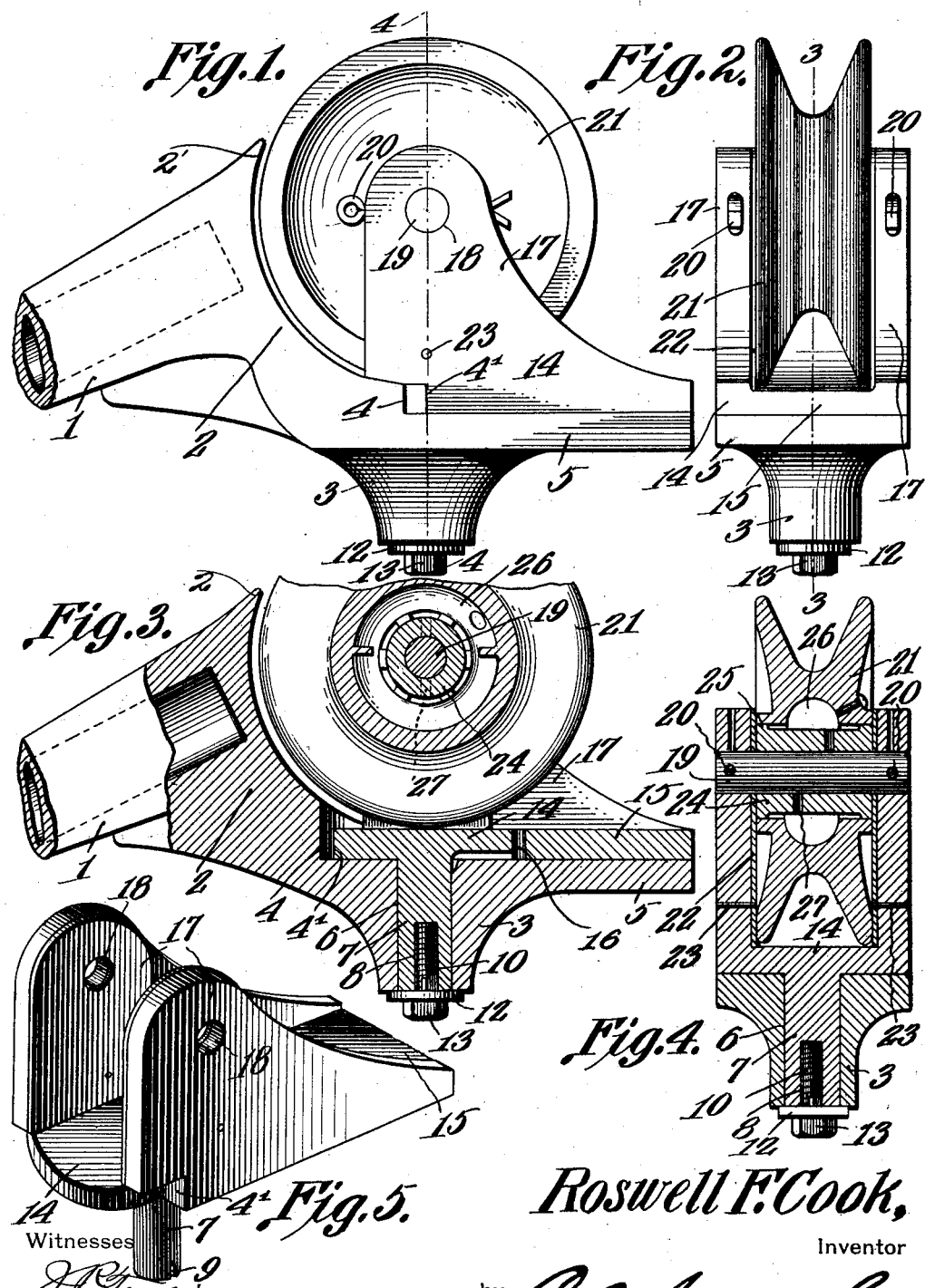

ROSWELL F. COOK, OF NEW YORK, N. Y.

TROLLEY.

1,056,630.  Specification of Letters Patent.  Patented Mar. 18, 1913.

Application filed July 10, 1912. Serial No. 708,722.

*To all whom it may concern:*

Be it known that I, ROSWELL F. COOK, a citizen of the United States, residing at New York city, in the county of New York and State of New York, have invented a new and useful Trolley, of which the following is a specification.

The present invention relates to improvements in trolleys, the primary object of the present invention being the provision of a novel supporting structure for a trolley wheel, carried by the upper end of the trolley pole, and so disposed as to hold and guide the wheel at all times into wire engaging position, regardless of the abruptness of the curve, the support for the wheel being provided with a rearwardly extending reinforcing member disposed at right angles to the vertical axis of its own pivoting medium and in opposite direction to the pole, so as to relieve the rear strain thrown upon the wheel and support due to the pulling of the trolley wheel and the tension of the trolley wire downwardly thereupon.

A further object of the present invention is the provision of a trolley wheel support having a rear extension adapted to co-act with a similar rear extension of the wheel supporting casting of a trolley pole, and co-act with the same to relieve the supporting stud or pintle of the wheel carrying frame from the strain due to the pressure of the wheel upon the trolley wire and the pressure of the trolley wire upon the wheel.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a side elevation of the casting carried by the upper end of the trolley pole with the present trolley wheel support and wheel in operable relation thereto. Fig. 2 is a rear elevation of the same. Fig. 3 is a section taken on line 3—3 of Fig. 2. Fig. 4 is a section taken on line 4—4 of Fig. 1. Fig. 5 is a perspective view of the trolley wheel carrying frame.

Referring to the drawings, the numeral 1 designates the ferrule or sleeve which is adapted to be secured to the upper end of a trolley pole (not shown), and which has formed integral therewith the supporting frame 2, the same being provided with the curved wheel protecting portion 2' and with the stud supporting lug 3. The oppositely disposed shoulders 4 are provided slightly forward of the vertical center of the stud 3 and projecting rearwardly therefrom at right angles to such shoulders is the plate 5, the purpose of which will presently appear. The projection 3 is provided with the cylindrical bore 6 for the reception of the pintle 7, and in the lower end of this pintle 7 is provided the threaded socket 8 with the diametrically disposed slots 9. The locking screw 10 is fitted within the threaded socket 8, while the washer 12 abuts the lower ends of the pintle 7 and the projection 3 and has its lugs 12 disposed within the slots 9 of the pintle, the head 13 of the securing screw 10 retaining the washer 12 in place and being itself locked to a certain extent against rotation by such washer. By this means the pintle 7 is locked to the casting 2 and is permitted a slight oscillation within the bore 6.

The wheel carrying frame, as clearly shown in Fig. 5, is provided with the bridging plate 14 whose rearward extension 15 is so constructed as to rest upon the upper face of the plate 5 and co-act therewith to relieve any rear strain upon the pintle 7, and yet permit the necessary oscillatory movement of the frame. Formed integral with the bridging plates 14 and 15 of the frame, are the two upstanding lugs 17, which are provided with alined apertures 18, the center of such apertures being in line with the axial line of the pintle 7 so that the rear extensions of the lugs 17 and the plate 15 form a brace to properly relieve the strain upon the pintle 7 due to the rearward and downward pressure of the trolley wire upon the wheel 21. Mounted in the apertures 18 of the lugs 17 is a pin or shaft 19 which is held against rotation by means of the cotters 20, the trolley wheel 21 being mounted upon such pin or shaft 19 between the respective lugs, as clearly shown. The contact plates 22 are connected upon the inner faces of the lugs 17 being held in position by means of the pin 19 at their upper ends and the smaller pins 23 secured to their lower ends and at the base of the lugs 17. A bushing 24 is disposed concentrically of the trolley wheel 21 and is provided with the annular shoulders 25 which fit snugly within the hub of the wheel and with the concentrically disposed chamber 26 of the wheel 21, provide an oil chamber for properly supplying the lubricating oil through the apertures 27 of the bushing 24 to properly lubricate the bushing with relation to the shaft or pin 19.

From the foregoing description, taken in connection with the drawings it is evident that with a swiveled frame as herein shown, the trolley wheel 21 will be properly held and supported relatively to the trolley pole and that the sharp or abrupt curves at the various points along the line may be readily taken with the wheel without the wheel jumping the wire, the swiveling of the pintle 7 within the stud 3 with the co-action of the respective shoulders 4 and 4' of the casting 2 and frame 14 permitting the necessary oscillatory movement of the wheel and frame, while the co-action of the plates 5 and 15 will take care of any strain thrown upon the pintle 7 due to the rearward and downward pressure of the trolley wire upon the wheel 21 during the traveling of the car.

In order to properly lubricate the connection between the plates 5 and 15 and also the pintle 7, the oil aperture 16 is provided in the plate 15.

What is claimed is:

A trolley, having a supporting frame carried by the pole, said supporting frame being formed with a curved wheel protecting projection having two shouldered portions, said frame being further provided with a hollow spindle supporting lug, and having a rearwardly extending plate at right angles to the axis of the lug; and a wheel carrying frame having a plate to slidably rest upon the rearwardly extending plate of the main supporting frame and with a spindle at the forward end thereof, said spindle being disposed to fit within the hollow lug of the supporting frame; means for retaining the spindle relatively to the supporting frame and to permit the wheel carrying frame an oscillatory movement, said wheel carrying frame being provided with two upstanding and parallel lugs, said lugs being provided with alined apertures, the centers of which are in the same line as the axis of the spindle, a pin disposed in said apertures and bridging the lugs, a trolley wheel mounted upon said pin, and two shouldered portions formed at the junction between the lugs and the base plate of the wheel carrying frame for co-action with the shouldered portions of the main carrying frame to limit the oscillatory movement of the wheel carrying frame.

In testimony that I claim the foregoing as my own, I have hereto affixed my signature in the presence of two witnesses.

ROSWELL F. COOK.

Witnesses:
ADELBERT A. BENEDICT,
W. W. COOK.

---

Copies of this patent may be obtained for five cents each, by addressing the "Commissioner of Patents, Washington, D. C."